United States Patent
Guen et al.

(10) Patent No.: US 9,219,268 B2
(45) Date of Patent: Dec. 22, 2015

(54) RECHARGEABLE SECONDARY BATTERY

(71) Applicant: SAMSUNG SDI CO., LTD., Yongin-si, Gyeonggi-do (KR)

(72) Inventors: Minhyung Guen, Yongin-si (KR); Yongchul Seo, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 208 days.

(21) Appl. No.: 13/916,415

(22) Filed: Jun. 12, 2013

(65) Prior Publication Data

US 2014/0295256 A1   Oct. 2, 2014

Related U.S. Application Data

(60) Provisional application No. 61/807,208, filed on Apr. 1, 2013.

(51) Int. Cl.
| | |
|---|---|
| *H01M 2/02* | (2006.01) |
| *H01M 2/34* | (2006.01) |
| *H01M 10/04* | (2006.01) |
| *H01M 2/10* | (2006.01) |
| *H01M 2/06* | (2006.01) |
| *H01M 4/70* | (2006.01) |

(52) U.S. Cl.
CPC *H01M 2/34* (2013.01); *H01M 2/06* (2013.01); *H01M 2/1016* (2013.01); *H01M 2/348* (2013.01); *H01M 4/70* (2013.01); *H01M 10/0431* (2013.01); *H01M 2200/103* (2013.01); *Y02E 60/122* (2013.01)

(58) Field of Classification Search
CPC ....... H01M 2/06; H01M 2/1016; H01M 2/34; H01M 10/0431

USPC .................................. 429/179, 517
See application file for complete search history.

(56) References Cited

U.S. PATENT DOCUMENTS

| | | | |
|---|---|---|---|
| 2008/0297301 | A1 | 12/2008 | Onken et al. |
| 2010/0167116 | A1 | 7/2010 | Okada |

(Continued)

FOREIGN PATENT DOCUMENTS

| | | |
|---|---|---|
| EP | 2 544 265 A1 | 1/2013 |
| JP | 2002-124236 | 4/2002 |

(Continued)

OTHER PUBLICATIONS

Internet: Search Report—Title: Improving shape structure when fuse is melted by external short circuit.

(Continued)

*Primary Examiner* — Jonathan Jelsma
(74) *Attorney, Agent, or Firm* — Christie, Parker & Hale, LLP

(57) ABSTRACT

An embodiment of the present invention provides a rechargeable secondary battery, which can rapidly cut off charge and/or discharge paths by a force provided from an elastic force offering part in addition to fusion of a fuse when an external short circuit or overcharge occurs to the rechargeable secondary battery. To this end, there is provided a rechargeable secondary battery including: a case; an electrode assembly in the case; a collector plate coupled to the electrode assembly and comprising a fuse part; a terminal coupled to the collector plate and extending to an outside of the case; and an elastic force offering part between the case and the collector plate.

18 Claims, 19 Drawing Sheets

(56) References Cited

U.S. PATENT DOCUMENTS

| | | | |
|---|---|---|---|
| 2011/0244281 A1* | 10/2011 | Byun | 429/62 |
| 2011/0305928 A1* | 12/2011 | Kim et al. | 429/61 |
| 2012/0126929 A1 | 5/2012 | Tong et al. | |
| 2013/0011699 A1* | 1/2013 | Kim et al. | 429/7 |

FOREIGN PATENT DOCUMENTS

| | | |
|---|---|---|
| KR | 10-2010-0077123 | 7/2010 |
| KR | 10-2012-0002406 | 1/2012 |

OTHER PUBLICATIONS

English Machine Translation of JP-2002-124236, 10 pages.

European Search Report, dated Jul. 1, 2014 for European Patent Application No. 13187732,6, 6 pages.

* cited by examiner

RECHARGEABLE SECONDARY BATTERY

CROSS-REFERENCE TO RELATED APPLICATION

This application claims priority to and the benefit of U.S. Provisional Application No. 61/807,208, filed on Apr. 1, 2013 in the U.S. Patent and Trademark Office, the entire content of which is incorporated herein by reference.

BACKGROUND

1. Field

Embodiments relate to a rechargeable secondary battery.

2. Description of the Related Art

A rechargeable lithium ion secondary battery may be used, for example, in a small-sized electronic device, such as a notebook computer or a cellular phone. Also, because recently developed rechargeable lithium ion secondary batteries have advantageous characteristics, including high output power, high capacity, and lightness in weight, as compared to other types of rechargeable secondary batteries, they are widely used in hybrid vehicles or electric vehicles.

Here, because the rechargeable lithium ion secondary battery used in a hybrid vehicle or an electric vehicle has relatively high capacity, a safety device for protecting against external short-circuit or over-charge is provided in the rechargeable lithium ion secondary battery. The safety device may cut off a charge or discharge path when the external short-circuit or over-charge occurs to the rechargeable lithium ion secondary battery.

SUMMARY

It is a feature of an embodiment to provide a rechargeable secondary battery, which rapidly cuts off charge and/or discharge paths by using a force provided by an elastic force offering part in addition to fusion of a fuse when an external short circuit or overcharge occurs to the rechargeable secondary battery.

It is a feature of an embodiment to provide a rechargeable secondary battery, which reduces (or minimizes) an arc discharge time by using a force provided by an elastic force offering part in addition to fusion of a fuse when an external short circuit or overcharge occurs to the rechargeable secondary battery.

It is a feature of an embodiment to provide a rechargeable secondary battery, which cuts off a fuse by using a power of an elastic force offering part even if the fuse is not completely fused due to an external short circuit or overcharge occurring to the rechargeable secondary battery, thereby reducing (or minimizing) an arc discharge time.

It is a feature of an embodiment to provide a rechargeable secondary battery, which prevents a fuse from being reconnected by using a force provided by an elastic force offering part in addition to fusion of a fuse when an external short circuit or overcharge occurs to the rechargeable secondary battery.

According to an aspect of the present invention, a secondary battery includes: a case; an electrode assembly in the case; a collector plate coupled to the electrode assembly and comprising a fuse part; a terminal coupled to the collector plate and extending to an outside of the case; and an elastic force offering part between the case and the collector plate.

The elastic force offering part may be configured to exert an elastic force on the fuse part.

The elastic force offering part may contact the collector plate at a location adjacent the fuse part.

The elastic force offering part may be configured to exert a force between the case and the collector plate in a direction that is substantially normal to a plane on which the fuse part is located.

The collector plate may further include: a first region coupled to the terminal; a second region extending from the first region and coupled to the electrode assembly; and a bent region between the first region and the second region, and the fuse part may be in the second region of the collector plate.

The collector plate may further include: a first region coupled to the terminal; a second region extending from the first region and coupled to the electrode assembly, and a bent region between the first region and the second region, and the fuse part may be in the first region of the collector plate.

A cross-sectional area of the fuse part may be smaller than a cross-sectional area of another region of the collector plate.

The fuse part may be defined by a fuse opening or a notch in the collector plate.

The fuse part may include a first portion at a first end of the fuse opening and a second portion at a second end of the fuse opening opposite the first end, and a width of each of the first portion and the second portion may be smaller than a width of each of the first region and the second region.

The elastic force offering part may be configured to separate the first region of the collector plate from the second region of the collector plate when the fuse part is fused.

The case may include a cap plate between the collector plate and the terminal, and the elastic force offering part may be between the collector plate and the cap plate.

The secondary battery may further include an insulation part covering the first region of the collector plate and between the collector plate and the cap plate, the collector plate may further include a first protrusion in the first region, the insulation part may include a second protrusion, and the elastic force offering part may be coupled between the first protrusion and the second protrusion.

The elastic force offering part may be configured to separate the first region of the collector plate from the second region of the collector plate when the fuse part is fused.

The first protrusion may extend substantially parallel to a side surface of the collector plate, and the second protrusion may extend substantially parallel to a side surface of the insulation part.

The secondary battery may further include an insulation part covering the first region of the collector plate and between the collector plate and the cap plate, the elastic force offering part may be between the collector plate and the insulation part.

The elastic force offering part may include a spring selected from the group consisting of a leaf spring, a coil spring, a volute spring, a ring spring, a spiral spring, a disc spring, a washer spring, a rubber spring, a fluid spring, an omega shaped spring, and a resin spring.

The elastic force offering part may be generally "W" shaped.

At least two portions of the elastic force operating part may contact the collector plate, and at least two other portions of the elastic force operating part may contact an insulation part that is between the collector plate and the case.

The electrode assembly may be at least partially suspended by the collector plate.

The secondary battery may further include: a second collector plate coupled to the electrode assembly and including a second fuse part; a second terminal coupled to the second collector plate and extending to the outside of the case; and a second elastic force offering part configured to exert an elastic force on the second fuse part.

According to an aspect of the present invention, a secondary battery includes: a case; an electrode assembly in the case; a collector plate coupled to the electrode assembly and having a notch; a terminal coupled to the collector plate and extending to an outside of the case; and an elastic force offering part between the case and the collector plate and contacts the collector plate at a location adjacent the notch.

According to an aspect of the present invention, a secondary battery includes: a case; an electrode assembly in the case; a collector plate coupled to the electrode assembly and having an opening therein; a terminal coupled to the collector plate and extending to an outside of the case; and an elastic force offering part in the opening in a compressed state.

BRIEF DESCRIPTION OF THE DRAWINGS

The above and other aspects and features of the present invention will become more apparent by describing in detail exemplary embodiments thereof with reference to the accompanying figures, of which:

FIG. 1b is a cross-sectional view taken along the line 1b-1b of FIG. 1a;

FIG. 1c is a cross-sectional view taken along the line 1c-1c of FIG. 1a;

FIG. 11b is a cross-sectional view of an elastic force offering part and a fuse part of the rechargeable secondary battery of FIG. 11a.

DETAILED DESCRIPTION

Figure 1A:
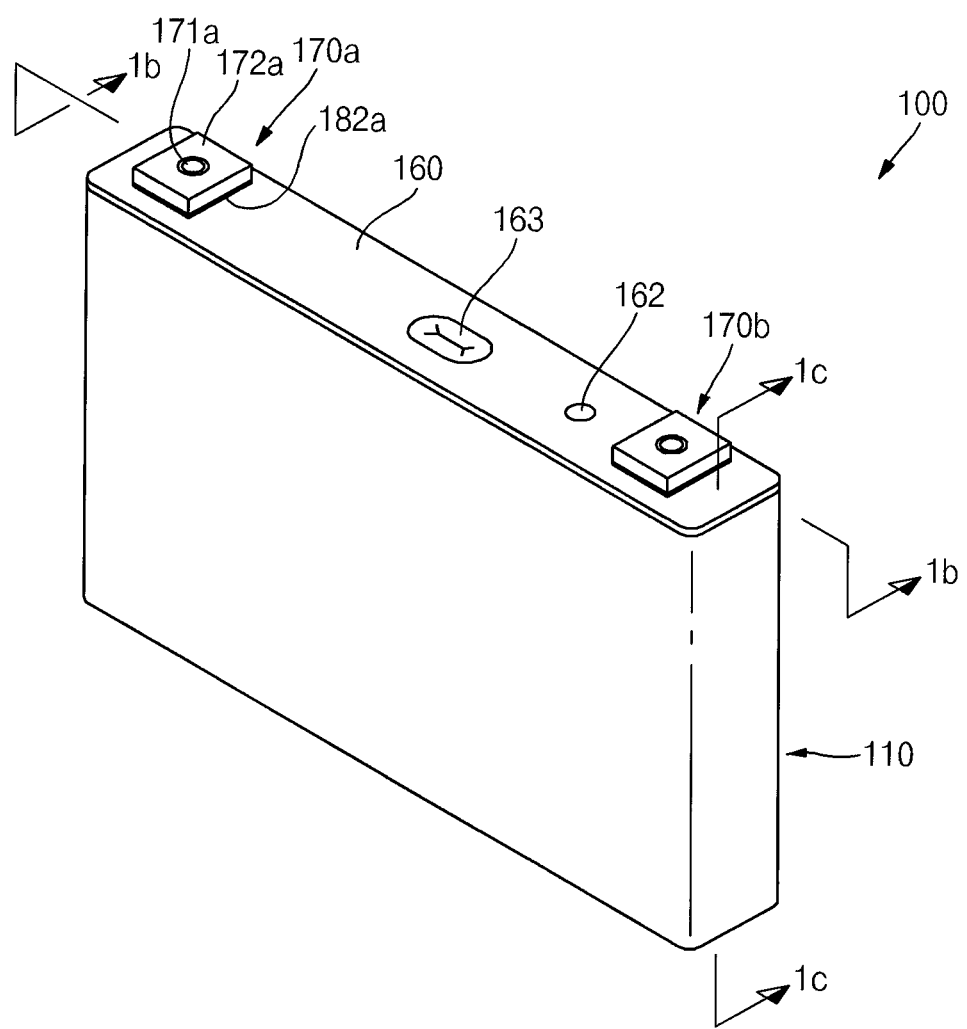
FIG. 1a is a perspective view of a rechargeable secondary battery according to an embodiment of the present invention.

Hereinafter, exemplary embodiments of the present invention will be described in detail with reference to the accompanying drawings. The present invention may, however, be embodied in many different forms and should not be construed as being limited to the embodiments set forth herein. Rather, these embodiments are provided so that this disclosure will be thorough and complete, and will fully convey the spirit and scope of the present invention to those skilled in the art. As such, the present invention should be defined by the appended claims and their equivalents.

In the drawings, the thickness of layers and regions are exaggerated for clarity. Like numbers refer to like elements throughout. As used herein, the term "and/or" includes any and all combinations of one or more of the associated listed items.

The terminology used herein is for the purpose of describing particular embodiments and is not intended to be limiting of the invention. As used herein, the singular forms are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that, although the terms "first," "second," etc. may be used herein to describe various members, elements, regions, layers and/or parts, these members, elements, regions, layers and/or parts should not be limited by these terms. These terms are only used to distinguish one member, element, region, layer and/or part from another member, element, region, layer and/or part. Thus, for example, a first member, element, region, layer and/or part discussed below could be termed a second member, element, region, layer and/or part without departing from the spirit and scope of the present invention.

Additionally, it will be understood that the term "fuse part" when used in this specification, means a region of the collector plate having a relatively small cross-sectional area. Thus, the term "fuse part" is a concept encompassing a fuse hole, fuse opening, or fuse notch for reducing a cross-sectional area. Further, it will be understood that the term "elastic force offering part" when used in this specification, means all metal or non-metal members that offer an elastic force, that is, all members that can offer an elastic force for rapidly cutting a fuse part when the fuse part is fused.

Figure 1B:
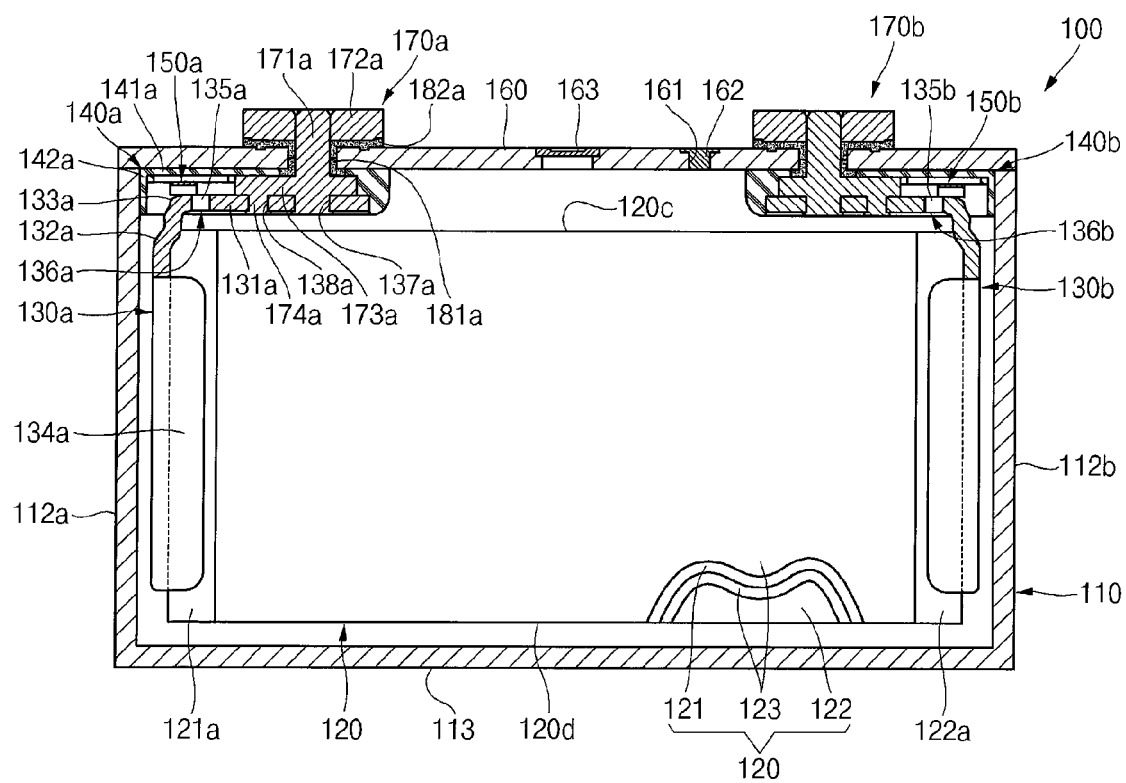
Figure 1C:
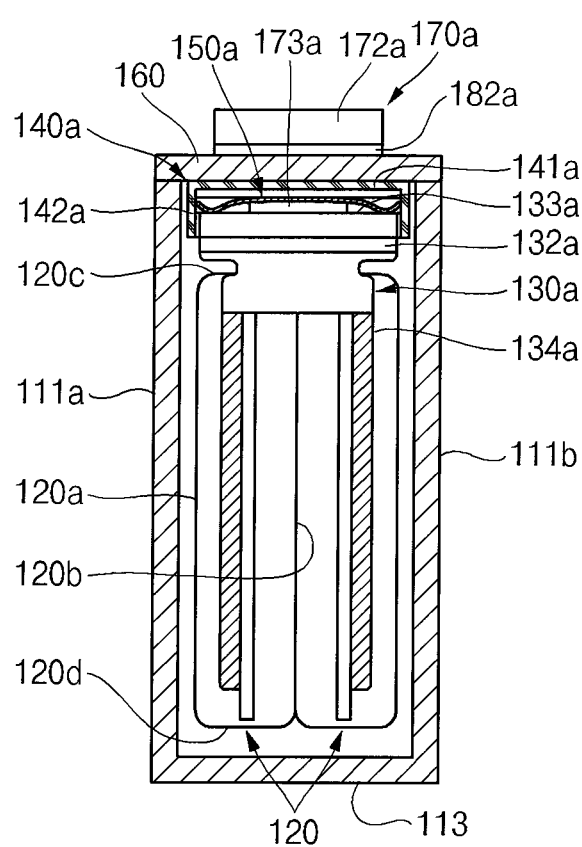
Figure 1D:
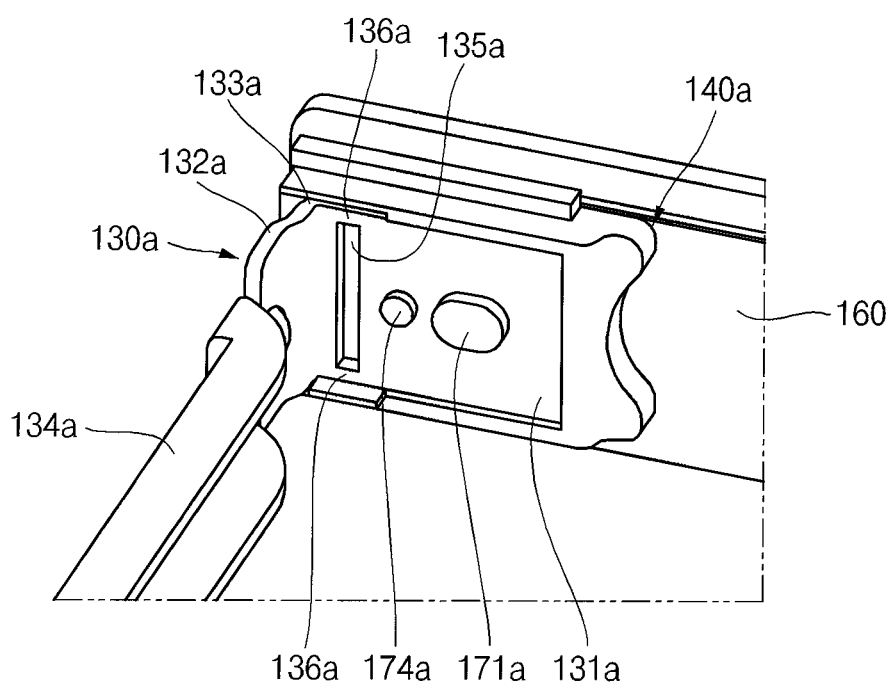
FIG. 1d is a partial perspective view of a collector plate and surrounding structure of a rechargeable secondary battery according to an embodiment of the present invention.
Figure 1E:
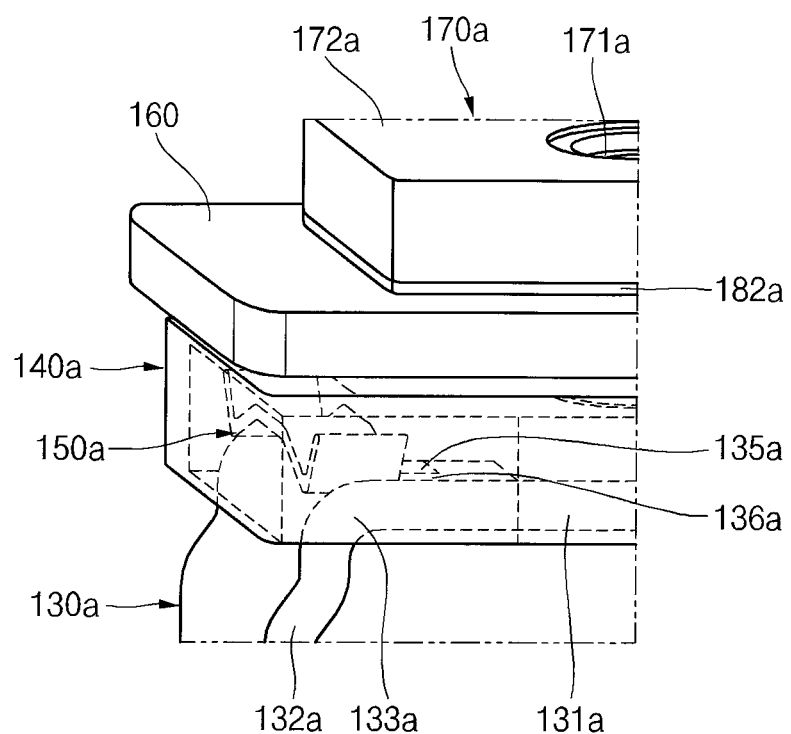
FIG. 1e is a partial projected view illustrating an elastic force offering part and surrounding structure of a rechargeable secondary battery according to an embodiment of the present invention.

Referring now to FIGS. 1a to 1e, FIG. 1a is a perspective view of a rechargeable secondary battery according to an embodiment of the present invention, FIG. 1b is a cross-sectional view taken along the line 1b-1b of FIG. 1a, FIG. 1c is a cross-sectional view taken along the line 1c-1c of FIG. 1a, FIG. 1d is a partial perspective view illustrating a collector plate and surrounding structure of a rechargeable secondary battery according to an embodiment of the present invention, and FIG. 1e is a partial projection view illustrating an elastic force offering part and surrounding structure of a rechargeable secondary battery according to an embodiment of the present invention.

As illustrated in FIGS. 1a to 1e, the rechargeable secondary battery 100 according to an embodiment of the present invention includes a case 110, an electrode assembly 120, a first collector plate 130a, a first insulation part 140a, a first elastic force offering part 150a, a second collector plate 130b, a second insulation part 140b, a second elastic force offering part 150b, a cap plate 160, a first terminal 170a, and a second terminal 170b.

While two electrode assemblies 120 are show in FIG. 1c, embodiments are not limited thereto, for example, there may be fewer than or greater than two electrode assemblies 120. In embodiments of the present invention, the case 110 may refer to a can, and/or may encompass the cap plate 160.

The case 110 includes a pair of long side walls 111a and 111b that are substantially planar and face each other, a pair of short side walls 112a and 112b that connect the long side walls 111a and 111b and face each other, and a bottom wall 113 connecting the long side walls 111a and 111b to the short side walls 112a and 112b. Here, areas of the long side walls are larger than those of the short side walls. The case 110 may have an open top area sealed with the cap plate 160. The electrode assembly 120 and an electrolyte solution are accommodated in the case 110. The case 110 may be made of one material selected from the group consisting of aluminum, an aluminum alloy, copper, a copper alloy, iron, an iron alloy, stainless steel and equivalents thereof, but aspects of the present invention are not limited thereto.

The electrode assembly 120 may include a pair of long side areas 120a and 120b that are substantially planar and face each other, and a pair of short side areas 120c and 120d that connect the long side areas 120a and 120b and face each other. Here, the long side areas are wider than the short side areas. In the electrode assembly 120, a first non-coating portion 121a that is not coated with a first active material (not shown) and a second non-coating portion 122a that is not coated with a second active material (not shown) extend (e.g., extend a predetermined length) in opposite directions. For example, the first non-coating portion 121a may extend and protrude to one side a predetermined length through the long side areas 120a and 120b and the short side areas 120c and 120d, and the second non-coating portion 122a may extend and protrude to the other side a predetermined length through the long side areas 120a and 120b and the short side areas 120c and 120d. In addition, the first non-coating portion 121a and the second non-coating portion 122a of the electrode assembly 120 may extend a predetermined length toward the short side walls 112a and 112b provided in the case 110, respectively.

The electrode assembly 120 may be formed by winding or laminating a stacked structure having a first electrode plate 121, a second electrode plate 122, and a separator 123 interposed between the first and second electrode plates 121 and 122, which are formed of a thin plate or layer. Here, the first electrode plate 121 may function as a positive electrode and the second electrode plate 122 may function as a negative electrode, or vice versa.

The first electrode plate 121 may be formed by applying a first electrode active material, such as a transition metal, on a first electrode collector plate (not shown) formed of, for example, aluminum foil. The first electrode plate 121 may include a first non-coating portion 121a on which the first electrode active metal is not applied. The first non-coating portion 121a may function as a passage for current flowing between the first electrode plate 121 and the outside of the first electrode plate 121. The present invention does not limit the material of the first electrode plate 121 to those listed herein.

The second electrode plate 122 may be formed by applying a second electrode active material, such as graphite or carbon, on a second electrode collector plate (not shown) formed of metal foil, such as copper, a copper alloy or nickel. The second electrode plate 122 may include a second non-coating portion 122a on which the second electrode active metal is not applied. The second non-coating portion 122a may function as a passage for current flowing between the second electrode plate 122 and the outside of the second electrode plate 122. The present invention, however, does not limit the material of the second electrode plate 122 to those listed herein. In other embodiments, the relative polarities of the first and second electrode plates 121 and 122 may differ from what is described above.

The separator 123 may be between the first electrode plate 121 and the second electrode plate 122 to prevent short circuiting and allow movement of lithium ions. The separator 123 may be formed of, for example, polyethylene, polypropylene, or combined film of polypropylene and polyethylene. The present invention does not limit the material of the separator 123 to those listed herein.

The electrode assembly 120 and an electrolyte solution are accommodated within the case 110. The electrolyte solution may include an organic solvent, such as ethylene carbonate (EC), propylene carbonate (PC), diethyl carbonate (DEC), ethyl methyl carbonate (EMC), or dimethyl carbonate (DMC), and a lithium salt, such as $LiPF_6$ or $LiBF_4$. The electrolyte may be a liquid, a solid, or a gel.

The first collector plate 130a is positioned inside the case 110 and is electrically connected between the first terminal 170a and the electrode assembly 120. For example, in one embodiment, the first collector plate 130a includes a first region 131a electrically connected to the first terminal 170a, a second region 132a bent from the first region 131a and electrically connected to the first non-coating portion 121a of the electrode assembly 120, and a bent region 133a between the first region 131a and the second region 132a. A third region 134a, which may be welded to the first non-coating portion 121a, may be connected to the second region 132a. With this configuration, the electrode assembly 120 is constructed such that it is substantially suspended from the first collector plate 130a. That is to say, the electrode assembly 120 may pull down on the first collector plate 130a due to gravity. According to one embodiment, a bottom portion of the electrode assembly 120 is spaced a suitable (or predetermined) distance apart from the bottom wall 113 of the case 110.

In one embodiment, a fuse opening (or hole) 135a is in the first region 131a of the first collector plate 130a. The fuse opening 135a may have a substantially rectangular shape. A pair of fuse parts 136a, having relatively small cross-sectional areas, may be at opposite sides of the fuse opening 135a. In one embodiment, widths of the fuse parts 136a may be smaller than a width of the first region 131a or the second region 132a. In the illustrated embodiment, through-holes are shown in the first region 131a to form the fuse parts 136a; however, cut portions may also be in the first region 131a to form the fuse parts 136a.

The fuse parts 136a may be fused by heat generated when an external short-circuit or over-charge occurs to the rechargeable secondary battery 100, thereby blocking a charge and/or discharge current. Accordingly, the safety of the rechargeable secondary battery 100 is improved.

In on embodiment, coupling openings (or holes) 137a and 138a may be in the first region 131a of the first collector plate 130a to be coupled to a fastening region 171a of the first terminal 170a and a coupling protrusion 174a.

The first collector plate 130a may include aluminum, an aluminum alloy, titanium, stainless steel, gold, tantalum, niobium, hafnium, zirconium, vanadium, indium, cobalt, tungsten, tin, beryllium, molybdenum, and alloys thereof. However, the present invention does not limit the material of the first collector plate 130a to those listed herein. In an embodiment, when the first collector plate 130a is made of aluminum, the fuse parts 136a are also made of aluminum. The melting point of aluminum is approximately 659° C. Thus, if the fuse parts 136a reach a temperature of approximately 659° C. due to an overcurrent, the fuse parts 136a melt and break. As the time required for the fuse parts 136a to melt and break is prolonged, an arc discharge time is also prolonged, thereby making the rechargeable secondary battery 100 internally unstable.

The first insulation part 140a may be constructed such that it substantially surrounds the first region 131a of the first collector plate 130a. For example, the first insulation part 140a may be positioned between the cap plate 160 and the first region 131a of the first collector plate 130a, and may surround the fastening region 171a of the first terminal 170a, a flange 173a, and the first region 131a of the first collector plate 130a. In more detail, the first insulation part 140a may include an upper region 141a and approximately four side regions 142a. The upper region 141a may be interposed between the first region 131a of the first collector plate 130a and the flange 173a of the first terminal 170a, and the cap plate 160. The four side regions 142a may surround the first region 131a of the first collector plate 130a, the fastening region 171a of the first terminal 170a, and the side region of the flange 173a. The first insulation part 140a may be made of, for example, polyphenylene sulfide (PPS) (which does not react with the electrolyte solution) and equivalents thereof, but the present invention does not limit the material of the first insulation part 140a to those listed herein.

According to one embodiment, the first elastic force offering part 150a is between the first collector plate 130a and the cap plate 160. For example, the first elastic force offering part 150a may be between the first region 131a of the first collector plate 130a and the first insulation part 140a. In more detail, the first elastic force offering part 150a may be between the fuse parts 136a of the first region 131a (or regions around the fuse parts 136a) and the upper region 141a of the first insulation part 140a. In one embodiment, the first elastic force offering part 150a is between the bent region 133a (which is between the first region 131a and the second region 132a) and the upper region 141a of the first insulation part 140a.

The first elastic force offering part 150a may be maintained in a compressed state between the bent region 133a of the first collector plate 130a and the upper region 141a of the first insulation part 140a. For example, the first elastic force offering part 150a may be maintained at a compressed state so as to downwardly push the fuse parts 136a, the regions adjacent to the fuse parts 136a, the bent region 133a, ends of the first region 131a, and/or ends of the second region 132a from the cap plate 160 or the first insulation part 140a. To this end, the first elastic force offering part 150a may have various shapes.

As illustrated in FIGS. 1c and 1e, the first elastic force offering part 150a may be substantially "W" shaped. For example, a region of the first elastic force offering part 150a may contact the upper region 141a of the first insulation part 140a, and another portion of the first elastic force offering part 150a may contact the fuse parts 136a, the regions adjacent to the fuse parts 136a, the bent region 133a, the ends of the first region 131a, and/or the ends of the second region 132a, or vice versa.

Therefore, according to an aspect of the present invention, the fuse parts 136a are capable of being rapidly broken by the fusion thereof and a force (e.g., an elastic force) provided by (or derived from) the elastic force offering part 150a when an overcurrent flows through the rechargeable secondary battery 100 due to, for example, an external short circuit or overcharge. Accordingly, during an external short circuit or overcharge of the rechargeable secondary battery 100, charge and/or discharge paths are rapidly cut off.

In general, an arc discharge may occur when fuse parts are fused. Arc discharges may affect electrolyte solutions, which may result in rapidly increasing the internal pressure of a rechargeable secondary battery. As described above, because the fuse parts 136a of embodiments of the present invention are rapidly cut off by the elastic force offering part 150a, an arc discharge time is reduced (or minimized). Therefore, internal pressure increasing due to arc discharges may be prevented (or suppressed).

In addition, in general, when fuse parts operate at a low current, rather than at a high current, they may not completely fuse. Under such conditions, the fuse parts 136a of embodiments of the present invention are cut off by the elastic force provided by the elastic force offering part 150a. In addition, in general, if fuse parts are fused for a relatively short time, they may reconnect. However, as described above, in embodiments of the present invention, the first region 131a and the second region 132a are separated away from each other by the elastic force of the elastic force offering part 150a, thereby preventing the fuse parts 136a from being reconnected.

The first elastic force offering part 150a may be one selected from the group consisting of a leaf spring, a coil spring, a volute spring, a ring spring, a spiral spring, a disc spring, a washer spring, an omega shaped spring, and equivalents thereof, but aspects of the present invention are not limited thereto.

The first elastic force offering part 150a may include metal or non-metal materials. According to some embodiments, a steel spring (e.g., carbon steel spring, an alloy steel spring, etc.) or a non-ferrous spring (e.g., a copper alloy spring, a nickel alloy spring, etc.) may be used as the metal material. Also, a rubber spring, a fluid spring (e.g., an air spring, a liquid spring, etc.) or a synthetic resin spring (e.g., a laminate spring, etc.) may be used as the non-metal material.

The cap plate 160 may cover an open portion of the case 110 while being exposed to or to protrude to the outside of the first terminal 170a. A boundary between the case 110 and the cap plate 160 may be welded by laser beam. In addition, an electrolyte injection opening (or hole) 161 may be in the cap plate 160. The electrolyte injection opening 161 may be closed by a plug 162, and a safety vent 163 having a relatively small thickness may also be in the cap plate 160. The cap plate 160 may be made of a substantially the same material as the case 110.

The first terminal 170a is electrically connected to the first collector plate 130a and outwardly extends a suitable (or a predetermined) length while passing through the cap plate 160. In an embodiment, the first terminal 170a is coupled to the first region 131a of the first collector plate 130a and outwardly extends a suitable (or a predetermined) length while passing through the first insulation part 140a and the cap plate 160. The first terminal 170a may be electrically and mechanically coupled to the coupling opening 137a provided in the first region 131a of the first collector plate 130a. The first terminal 170a may include a pillar-shaped fastening region 171a, and a fixing region 172a fixed to the case 110 or the fastening region 171a outside the cap plate 160 and having a bus bar (not shown) coupled thereto. In addition, a leaf-shaped flange 173a horizontally extending a suitable (or a predetermined) length may be inside the case 110 or in the cap plate 160 in the fastening region 171a. The flange 173a may include a coupling protrusion 174a coupled to the coupling opening 138a downwardly extending and provided in the first region 131a of the first collector plate 130a. Here, a top surface of the flange 173a may make close contact with the upper region 141a of the first insulation part 140a. In addition, a suitable (or predetermined) space may be between the flange 173a and the side region 142a of the first insulation part 140a, and the first elastic force offering part 150a may be positioned in this space. The fuse parts 136a and the bent region 133a of the first collector plate 130a may also be in this space.

Here, the fastening region 171a, the fixing region 172a, the flange 173a, and the coupling protrusion 174a, forming the first terminal 170a, may include one selected from the group consisting of aluminum, an aluminum alloy, and equivalents thereof, but the present invention does not limit the materials of the fastening region 171a, the fixing region 172a, the flange 173a and the coupling protrusion 174a.

The fastening region 171a positioned on the cap plate 160 may be coupled to the fixing region 172a to be riveted or welded, and the fastening region 171a and the coupling protrusion 174a positioned under the cap plate 160 may be coupled to the coupling openings 137a and 138a provided in the first region 131a of the first collector plate 130a to be riveted or welded.

The fastening region 171a of the first terminal 170a may pass through the cap plate 160, and a seal gasket 181a may be on the outer circumference. Therefore, the first terminal 170a may be insulated from the cap plate 160. In an embodiment, the seal gasket 181a may be made of polyphenylene sulfide (PPS) (which does not react with the electrolyte solution), but the present invention does not limit the material of the seal gasket 181a to those listed herein.

An upper insulation part 182a may be provided between the fixing region 172a and the case 110. The upper insulation part 182a may make close contact with the seal gasket 181a. The upper insulation part 182a insulates the first fixing region 172a from the cap plate 160. In an embodiment, the upper insulation part 182a may be made of polyphenylene sulfide (PPS), but the present invention does not limit the material of the upper insulation part 182a to those listed herein.

When a battery has the case 110 and the cap plate 160 charged as a positive electrode, the fixing region 172a and the cap plate 160 may be electrically connected to each other by a high-resistance member (not shown).

The second collector plate 130b, the second insulation part 140b, the second elastic force offering part 150b, and the second terminal 170b may be substantially the same as the first collector plate 130a, the first insulation part 140a, the first elastic force offering part 150a, and the first terminal 170a. In addition, a fuse opening (or hole) 135b and a fuse part 136b may be provided in the second collector plate 130b. In some embodiments, the fuse opening 135b and the fuse part 136b may not be provided in the second collector plate 130b, and the second elastic force offering part 150b may not be provided at the second collector plate 130b. One reason for the foregoing will now be described briefly. The second collector plate 130b may be made of copper or a copper alloy, and a melting point of copper is approximately 1,083° C., which is higher than that of aluminum. In general, before the fuse part 136b of the second collector plate 130b operates, the fuse parts 136a of the first collector plate 130a may first operate, so that charge current and/or discharge current are cut off. However, in order to further improve the safety of the rechargeable secondary battery 100, as shown in FIG. 1b, the fuse opening 135b and the fuse part 136b of the second collector plate 130b and the second elastic force offering part 150b may be installed.

The first collector plate 130a and the second collector plate 130b, the first insulation part 140a and the second insulation part 140b, and the first elastic force offering part 150a and the second elastic force offering part 150b may have substantially the same configurations, respectively. Therefore, the present invention will be described below by generally designating the respective components as the current collector plate 130a, the insulation part 140a and the elastic force offering part 150a.

Figure 2A:
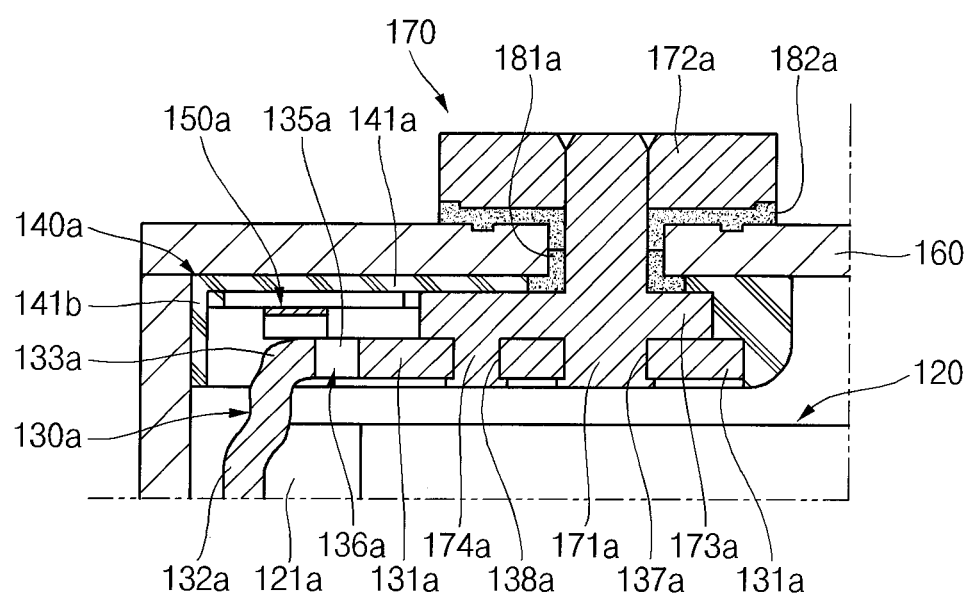
FIGS. 2a and 2b are partial enlarged sectional views illustrating an elastic force offering part and surrounding structure of a rechargeable secondary battery according to an embodiment of the present invention.
Figure 2B:
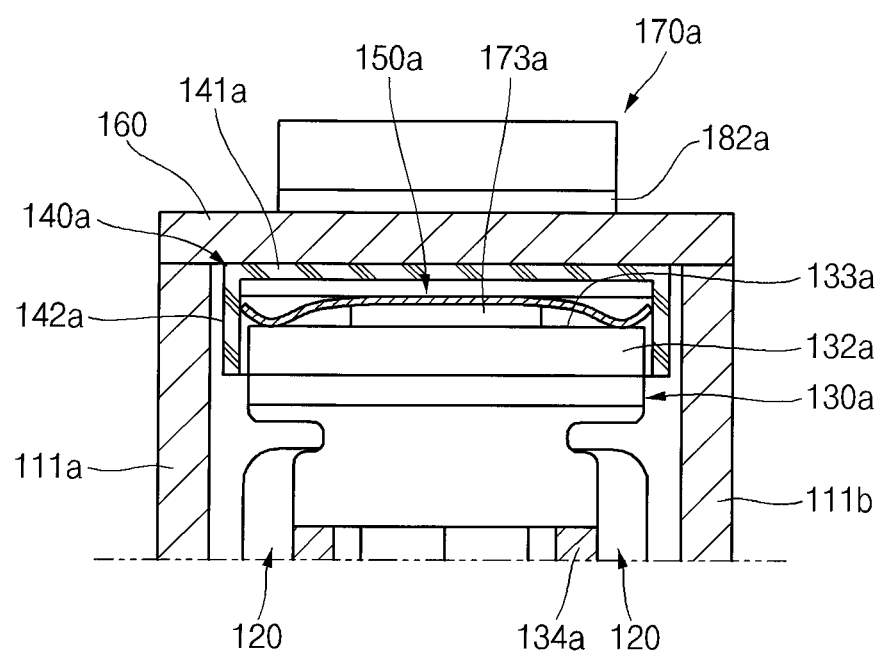

FIGS. 2a and 2b are partial enlarged sectional views illustrating an elastic force offering part and surrounding structure of a rechargeable secondary battery according to an embodiment of the present invention.

As illustrated in FIGS. 2a and 2b, the elastic force offering part 150a is on the ends of the first region 131a or the ends of the second region 132a in the current collector plate 130a, the fuse parts 136a, the regions adjacent to the fuse parts 136a, or the bent region 133a. The upper region 141a of the insulation part 140a may be on the elastic force offering part 150a.

The elastic force offering part 150a may be substantially "W" shaped. At least two regions of the elastic force offering part 150a may contact the current collector plate 130a, and at least two other regions of the elastic force offering part 150a may contact the upper region 141a or the side regions 142a of the insulation part 140a.

According to an embodiment, the elastic force offering part 150a is maintained at a compressed state between the collector plate 130a and the insulation part 140a. Therefore, when the fuse parts 136a are fused, the elastic force offering part 150a allows the second region 132a of the current collector plate 130a to rapidly move downwards.

Figure 3:
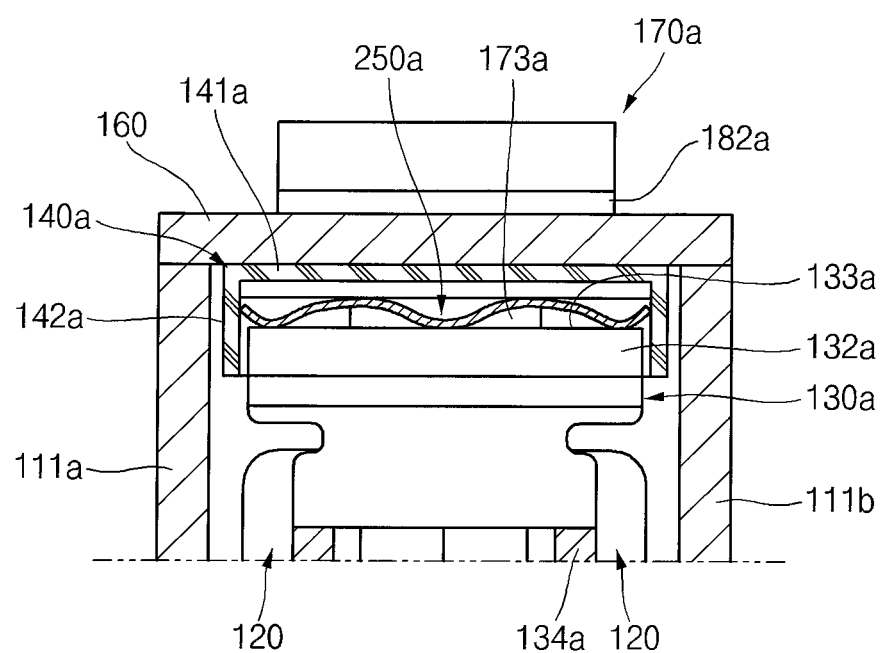
FIGS. 3 to 5 are partial enlarged sectional views illustrating an elastic force offering part and surrounding structure of a rechargeable secondary battery according to an embodiment of the present invention.
Figure 4:
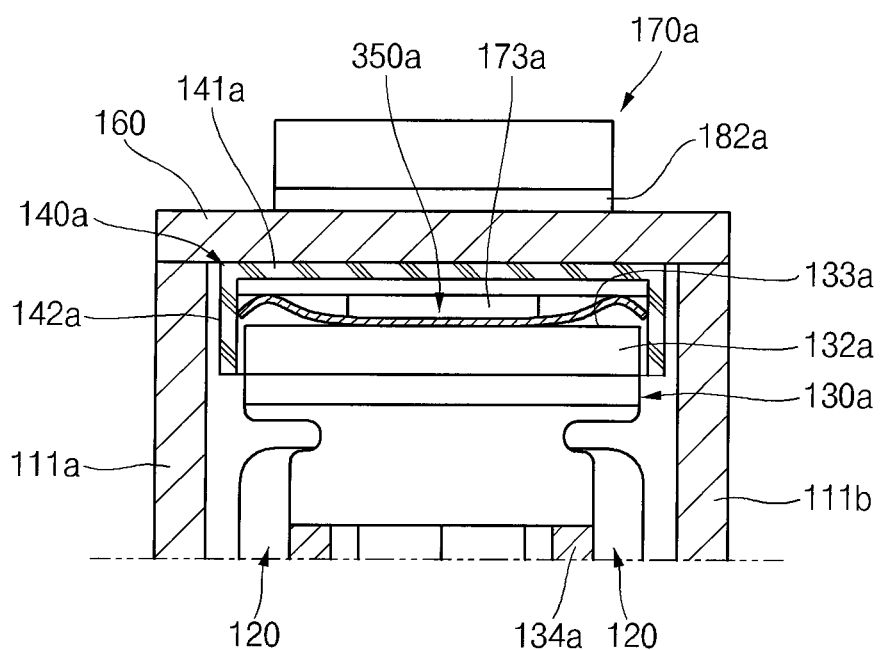
Figure 5:
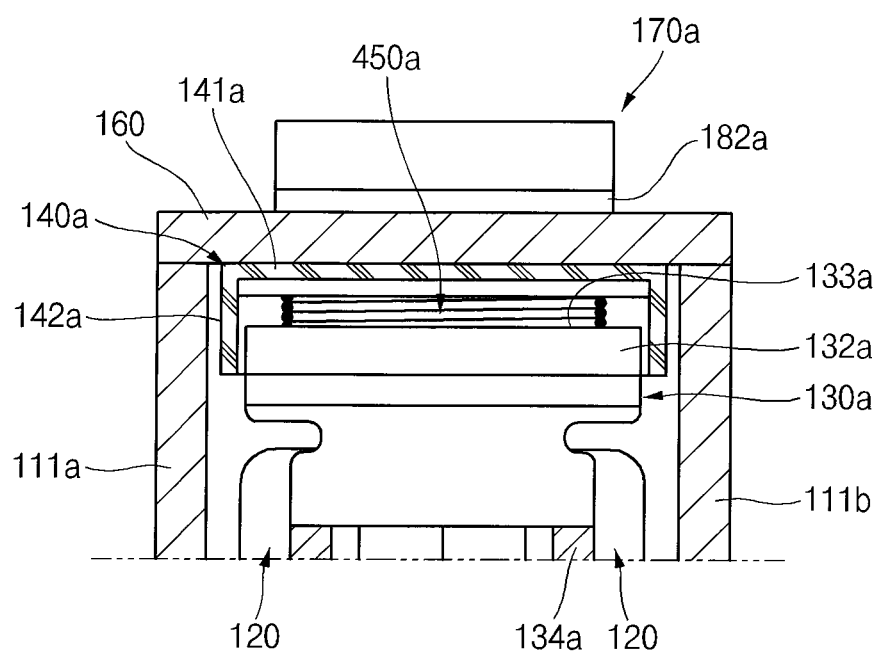

FIGS. 3 to 5 are partial enlarged sectional views illustrating an elastic force offering part and surrounding structure of a rechargeable secondary battery according to an embodiment of the present invention.

As illustrated in FIG. 3, in one embodiment, at least three regions of an elastic force offering part 250a contact ends of a first region 131a or ends of a second region 132a of a current collector plate 130a, fuse parts 136a, regions adjacent to the fuse parts 136a, or a bent region 133a. Here, the elastic force offering part 250a may contact at least two regions of an upper region 141a or side regions 142a of an insulation part 140a.

Therefore, in the present embodiment, at least three regions of the elastic force offering part 250a push (e.g., downwardly push) the ends of the first region 131a, the ends of the second region 132a, the fuse parts 136a, the regions adjacent to the fuse parts 136a, or the bent region 133a.

In an embodiment, as illustrated in FIG. 4, at least one region of an elastic force offering part 350a contacts ends of a first region 131a or ends of a second region 132a of a current collector plate 130a, fuse parts 136a, regions adjacent to the fuse parts 136a, or a bent region 133a. Here, at least two regions of the elastic force offering part 350a may contact an upper region 141a and/or side regions 142a of an insulation part 140a.

Therefore, in the present embodiment, at least one region of the elastic force offering part 350a pushes (e.g., downwardly pushes) the ends of the first region 131a, the ends of the second region 132a, the fuse parts 136a, the regions adjacent to the fuse parts 136a, or the bent region 133a.

In an embodiment, as illustrated in FIG. 5, at least one region of an elastic force offering part 450a contacts ends of a first region 131a or ends of a second region 132a of a current collector plate 130a, fuse parts 136a, regions adjacent to the fuse parts 136a, or a bent region 133a. Here, at least one region of the elastic force offering part 450a may contact an upper region 141a of an insulation part 140a.

Therefore, in the present embodiment, at least one region of the elastic force offering part 450a pushes (e.g., downwardly pushes) the ends of the first region 131a, the ends of the second region 132a, the fuse parts 136a, the regions adjacent to the fuse parts 136a, or the bent region 133a. Here, the elastic force offering part 450a may be a coil spring, rather than the leaf spring described above.

Figure 6A:
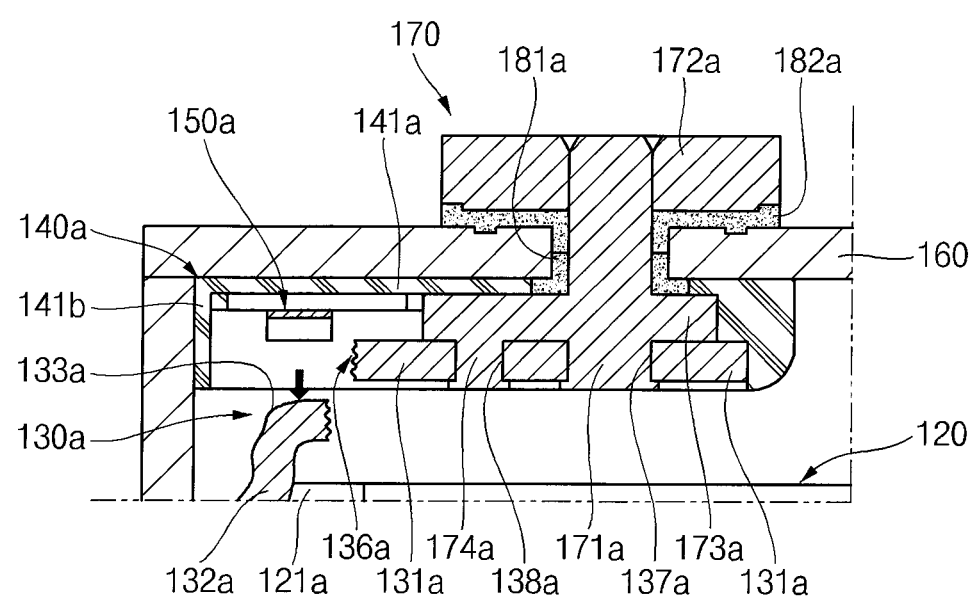
FIGS. 6a and 6b are partial enlarged sectional views illustrating operating states of a fuse part and an elastic force offering part in the rechargeable secondary battery according to an embodiment of the present invention.
Figure 6B:
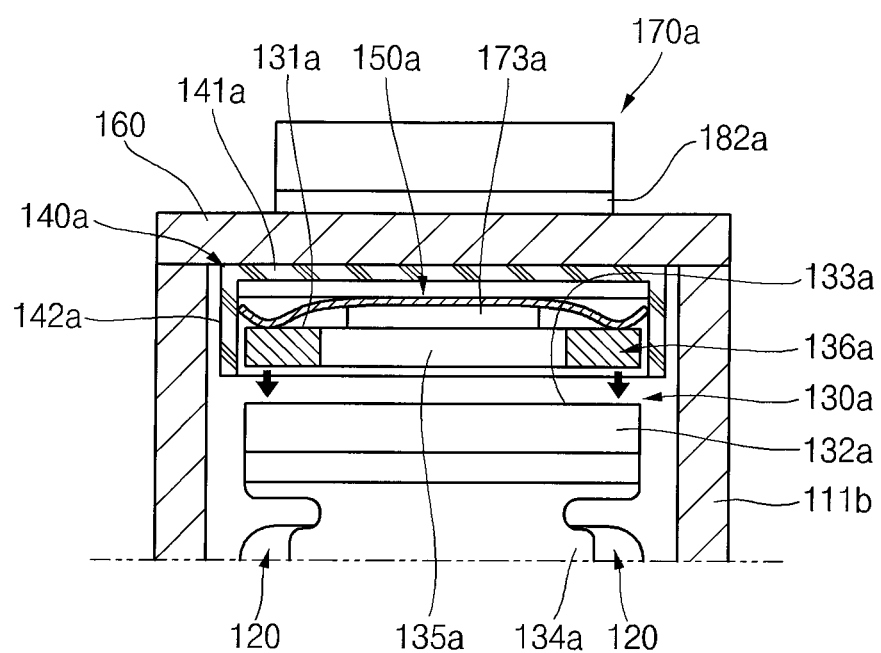

FIGS. 6a and 6b are partial enlarged sectional views illustrating operating states of a fuse part and an elastic force offering part of a rechargeable secondary battery according to embodiments of the present invention.

As illustrated in FIGS. 6a and 6b, when the fuse parts 136a are fused, the elastic force offering part 150a provides a downward force from above that is an elastic force, thereby allowing for rapidly cutting off the fuse parts 136a. That is to say, the first region 131a and the second region 132a of the current collector plate 130a are rapidly separated away from each other. In one embodiment, because the electrode assembly 120 (having a predetermined mass) is configured to be suspended by the second region 132a of the current collector plate 130a, the first region 131a and the second region 132a, are assisted to rapidly separate away from each other by gravity acting on the electrode assembly 120. Therefore, according to an aspect of the present invention, the first region 131a and the second region 132a are capable of more rapidly being separated away from each other by the elastic force of the elastic force offering part 150a and the gravity.

Figure 7A:
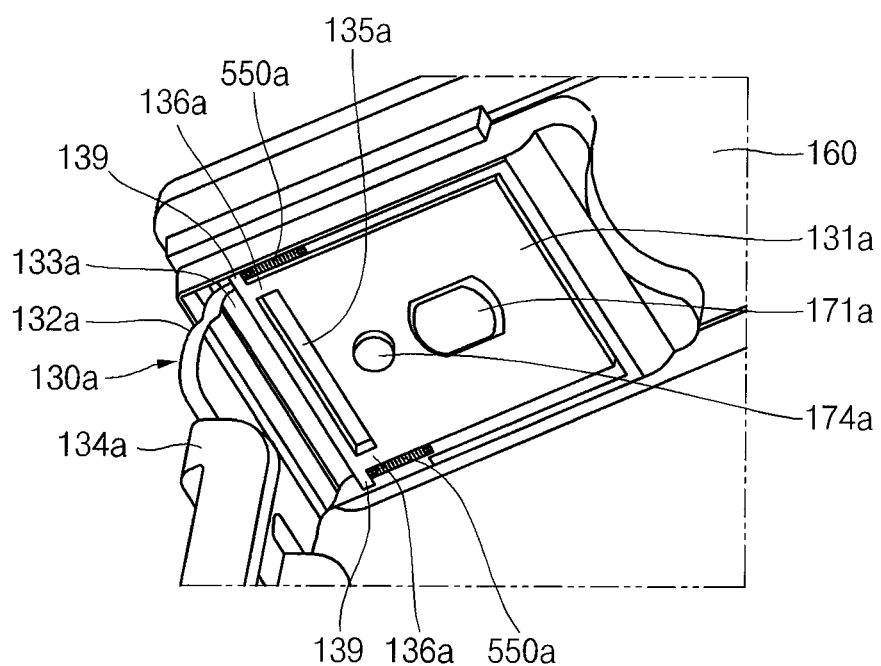
FIG. 7a is a partial perspective view illustrating a collector plate and an elastic force offering part of a rechargeable secondary battery according to an embodiment of the present invention.
Figure 7B:
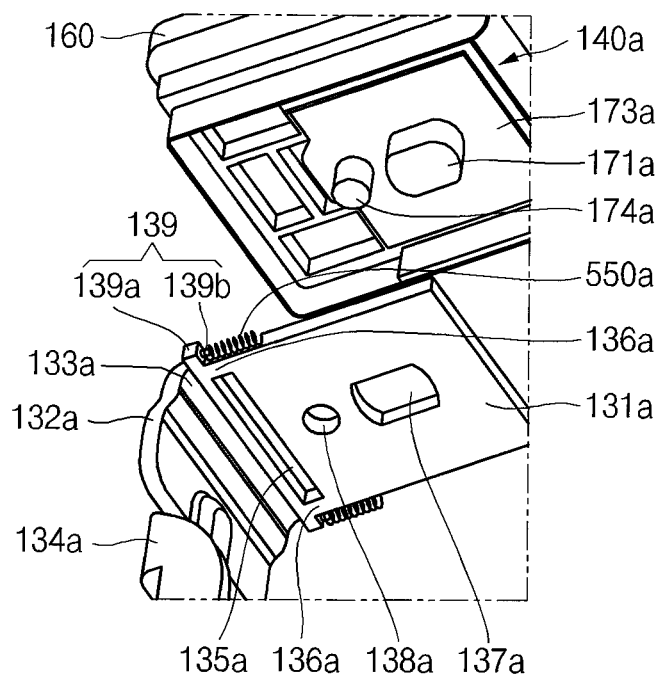
FIG. 7b is a partial exploded view illustrating a collector plate and an elastic force offering part of a rechargeable secondary battery according to an embodiment of the present invention.
Figure 7C:
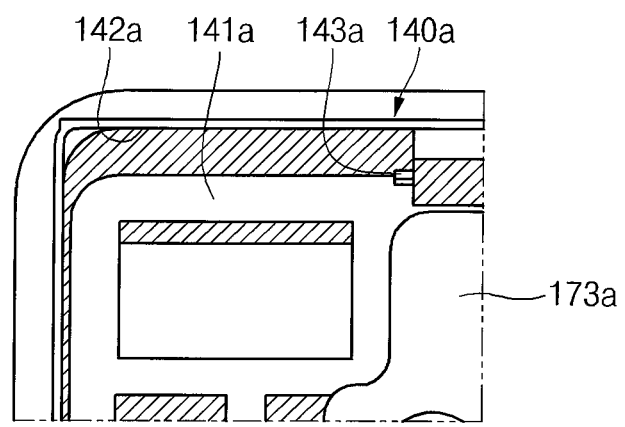
FIG. 7c is a bottom view illustrating a portion of a lower insulation part where the elastic force offering part is positioned according to an embodiment of the present invention.

FIG. 7a is a partial perspective view illustrating a collector plate and an elastic force offering part according to an embodiment of the present invention, FIG. 7b is a partial exploded view illustrating the collector plate and the elastic force offering part, and FIG. 7c is a bottom view illustrating a portion of a lower insulation part where the elastic force offering part is positioned.

As illustrated in FIGS. 7a to 7c, embodiments of the present invention may include protrusions 139 outwardly protruding a suitable (or predetermined) length at opposite sides of the ends of the first region 131a or the second region 132a of the current collector plate 130a, opposite sides of the bent region 133a, or opposite sides of the fuse parts 136a. For example, the protrusions 139 may include vertical protrusions 139a substantially vertically extending from side surfaces of the current collector plate 130a and a horizontal protrusion 139b extending in substantially parallel to the side surfaces of the current collector plate 130a.

Here, one end of an elastic force offering part 550a may be coupled to the horizontal protrusion 139b. In addition, a horizontal protrusion 143a may also be in the side region 142a of the insulation part 140a substantially surrounding the first region 131a of the current collector plate 130a. Further, the other end of the elastic force offering part 550a may be coupled to the horizontal protrusion 143a. That is to say, the elastic force offering part 550a may be between the horizontal protrusion 139b in the current collector plate 130a and the horizontal protrusion 143a in the insulation part 140a. The elastic force offering part 550a may be one selected from the group consisting of a compressed coil spring, a volute spring, a spiral spring, and equivalents thereof. However, the present invention does not limit the material of the elastic force offering part 550a to those listed herein.

As described above, the elastic force offering part 550a may be maintained at a state in which it horizontally pushes the protrusions 139 of the current collector plate 130a from the inside of the insulation part 140a.

Figure 8:
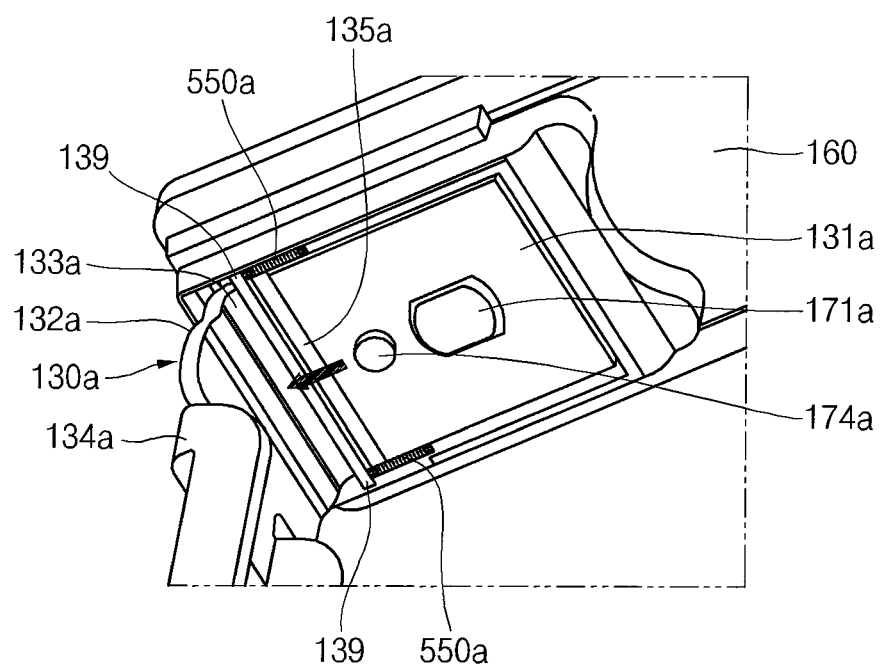
FIG. 8 is a partial enlarged sectional view illustrating operating states of a fuse part and an elastic force offering part in a rechargeable secondary battery according to an embodiment of the present invention.

FIG. 8 is a partial enlarged sectional view illustrating an operating state of a fuse part and an elastic force offering part of a rechargeable secondary battery according to an embodiment of the present invention.

As illustrated in FIG. 8, when (e.g., at the same time) the fuse parts 136a are fused, the elastic force offering part 550a pushes (e.g., horizontally pushes) the protrusions 139 of the current collector plate 130a, thereby allowing the fuse parts 136a to be rapidly separated away from each other. That is to say, the first region 131a and the second region 132a of the current collector plate 130a are rapidly separated away from each other. Moreover, because the electrode assembly 120 may be suspended by the current collector plate 130a, the second region 132a of the current collector plate 130a may immediately fall down. Therefore, according to the present invention, charge and/or discharge paths may be rapidly cut off by a force provided by an elastic force offering part (in addition to fusion of the fuse parts 136a) when an external short circuit or overcharge occurs to the rechargeable secondary battery.

Figure 9:
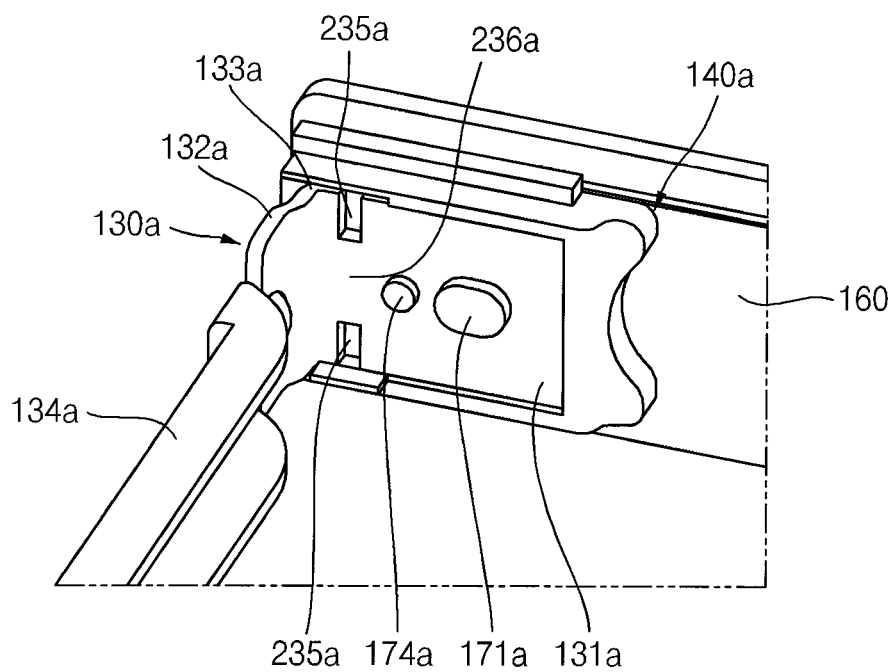
FIG. 9 is a partial perspective view illustrating a collector plate and surrounding structure of a rechargeable secondary battery according to an embodiment of the present invention.

FIG. 9 is a partial perspective view illustrating a collector plate and surrounding structure of a rechargeable secondary battery according to another embodiment of the present invention. In the embodiment illustrated in FIG. 9, a fuse part 236a is defined by one or more notches 235a. In the present embodiment, a width of the fuse part 236a is smaller than a width of each of the first region 131a and/or the second region 132a of the collector plate 130a.

A first elastic force offering part may be between the fuse part 236a of the first region 131a (or regions around the fuse part 236a) and the cap plate 160. In one embodiment, the elastic force offering part is between the bent region 133a (which is between the first region 131a and the second region 132a) and the first insulation part 140a. The first elastic force offering part may be maintained in a compressed state between the bent region 133a of the first collector plate 130a and the first insulation part 140a. The elastic force offering part may assist the separation of the first region 131a and the second region 132a of the first collector plate 130a when the fuse part 236a is fused.

Figure 10:
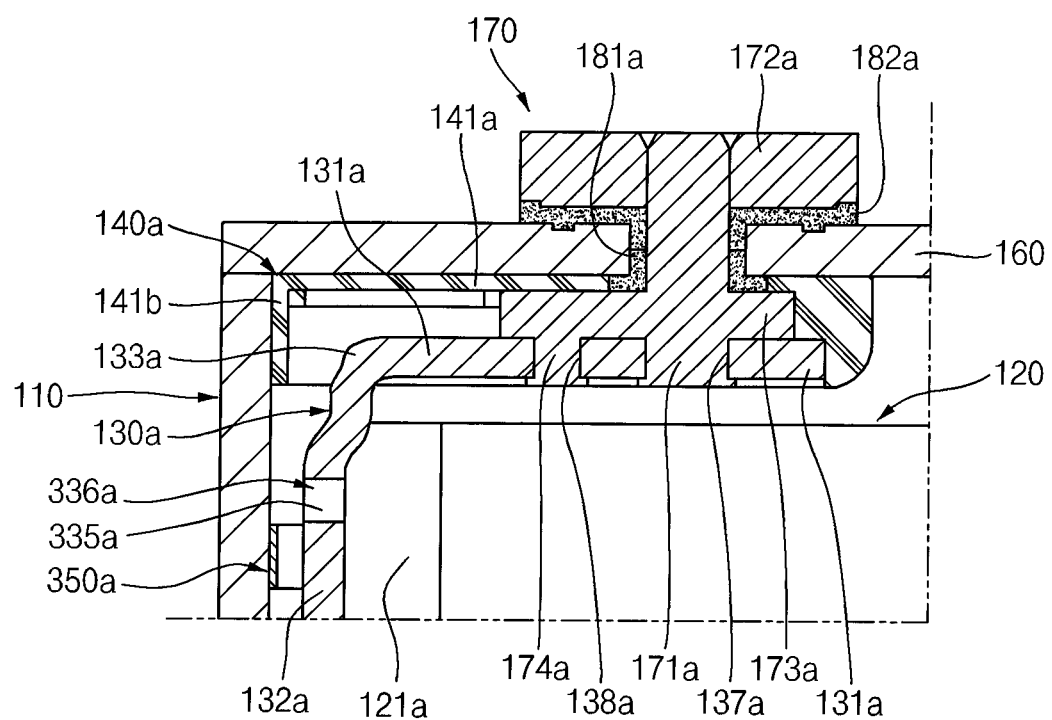
FIG. 10 is a partial enlarged sectional view illustrating an elastic force offering part and surrounding structure of a rechargeable secondary battery according to an embodiment of the present invention.

FIG. 10 is partial enlarged sectional view illustrating an elastic force offering part and surrounding structure of a rechargeable secondary battery according to an embodiment of the present invention. In the present embodiment, an elastic force offering part 350a is between the case 110 and the second region 132a of the collector plate 130a. The elastic force offering part 350a is in a compressed state between the case 110 and the second region 132a of the collector plate 130a when the fuse part 336a is not fused. Here, the fuse part 336a has an opening 335a. The elastic force offering part 350a is configured to horizontally separate the second region 132a of the collector plate 130a from the first region 131a of the collector plate 130a when the fuse part 336a is fused.

According to an embodiment of the present invention, the elastic force offering part 350a may be made of an insulation material in order to prevent a short circuit between the case 110 and the collector plate 130a.

Figure 11A:
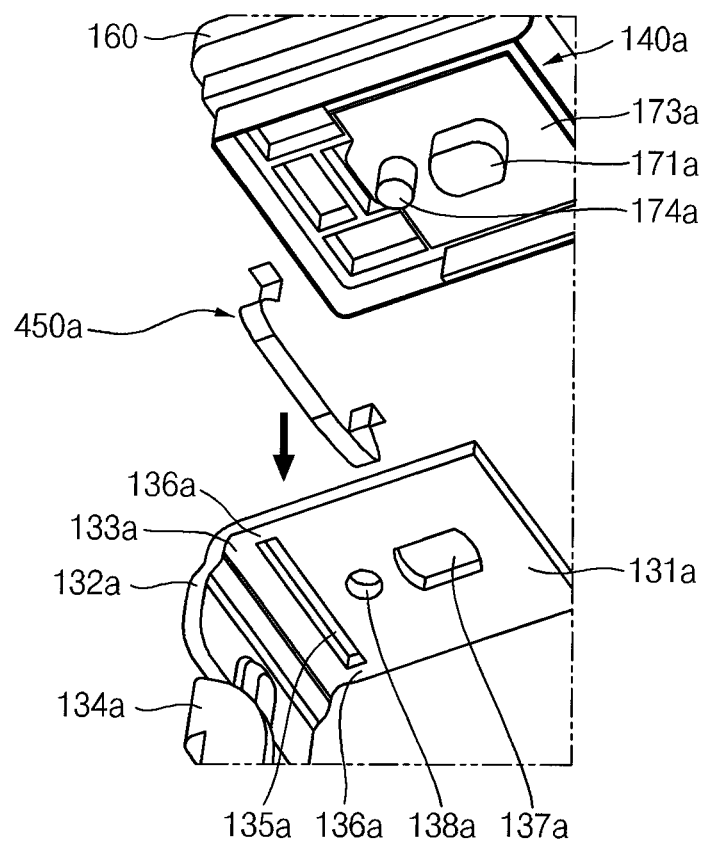
FIG. 11a is a partial exploded view illustrating a collector plate and an elastic force offering part of a rechargeable secondary battery according to an embodiment of the present invention.
Figure 11B:
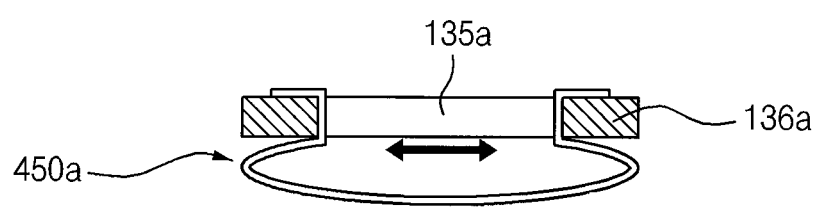

FIG. 11a is a partial exploded view illustrating a collector plate and an elastic force offering part of a rechargeable secondary battery according to an embodiment of the present invention, and FIG. 11b is a cross-sectional view of an elastic force offering part and a fuse part of the rechargeable secondary battery of FIG. 11a.

According to the present embodiment, an elastic force offering part 450a may be directly disposed in the opening 135a and may be in a compressed state in the opening 135a. The elastic force offering part 450 may have a reversed and compressed omega shape or equivalents thereof. Therefore, the elastic force offering part 450a may be configured to separate (e.g., horizontally separate) the fuse part 136a from the collector plate 130a when the fuse part 336a is fused.

The elastic force offering part 450a may be made of an insulation material in order to prevent the reconnection from the first region 131a and second region 132a of the collector plate 130a.

While the rechargeable secondary battery provided according to the present invention has been described in connection with certain exemplary embodiments, it will be understood by those skilled in the art that the invention is not limited to the disclosed embodiments, but rather is intended to cover various modifications included within the spirit and scope of the appended claims and equivalents thereof.

| Partial List of Reference Numerals |
|---|
| 100: rechargeable secondary battery; |
| 110: Case; |
| 120: Electrode assembly; |
| 121: First electrode plate; |
| 121a: First non-coating portion; |
| 122: Second electrode plate; |
| 122a: Second non-coating portion; |
| 123: Separator; |
| 130a: First collector plate; |
| 131a: First region; |
| 132a: Second region; |
| 133a: Bent region; |
| 134a: Third region; |
| 135a: Fuse opening; |
| 136a: Fuse part; |
| 137a, 138a: Coupling opening; |
| 140a: First insulation part; |
| 141a: Upper region; |
| 142a: Side region; |
| 150a: First elastic force offering part; |
| 130b: Second collector plate; |
| 140b: Second insulation part; |
| 150b: Second elastic force offering part; |
| 160: Cap plate; |
| 161: Injection opening; |
| 162: Plug; |
| 163: Safety vent; |
| 170a: First terminal; |
| 171a: Fastening region; |
| 172a: Fixing region; |
| 173a: Flange; |
| 174a: Coupling protrusion; |
| 181a: Seal gasket; |
| 182a: Upper insulation part; |
| 170b: Second terminal; |

What is claimed is:

1. A secondary battery comprising:
a case;
an electrode assembly in the case;
a collector plate coupled to the electrode assembly and comprising a fuse part;
a terminal coupled to the collector plate and extending to an outside of the case; and
an elastic force offering part between the case and a surface of the collector plate facing the case,
wherein the elastic force offering part is positioned outside of the fuse part
wherein the elastic force offering part is generally "W" shaped,
wherein at least two portions of the elastic force operating part contacts the collector plate, and
wherein at least two other portions of the elastic force operating part contacts an insulation part that is between the collector plate and the case.

2. The secondary battery of claim 1, wherein the elastic force offering part is configured to exert an elastic force on the fuse part.

3. The secondary battery of claim 1, wherein the elastic force offering part contacts the collector plate at a location adjacent the fuse part.

4. The secondary battery of claim 1, wherein the elastic force offering part is configured to exert a force between the case and the collector plate in a direction that is substantially normal to a plane on which the fuse part is located.

5. The secondary battery of claim 1,
wherein the collector plate further comprises:
a first region coupled to the terminal;
a second region extending from the first region and coupled to the electrode assembly; and
a bent region between the first region and the second region,
wherein the fuse part is in the second region of the collector plate.

6. The secondary battery of claim 1,
wherein the collector plate further comprises:
a first region coupled to the terminal;
a second region extending from the first region and coupled to the electrode assembly; and
a bent region between the first region and the second region,
wherein the fuse part is in the first region of the collector plate.

7. The secondary battery of claim 6, wherein a cross-sectional area of the fuse part is smaller than a cross-sectional area of another region of the collector plate.

8. The secondary battery of claim 6, wherein the fuse part is defined by a fuse opening or a notch in the collector plate.

9. The secondary battery of claim 8,
wherein the fuse part comprises a first portion at a first end of the fuse opening and a second portion at a second end of the fuse opening opposite the first end, and
wherein a width of each of the first portion and the second portion is smaller than a width of each of the first region and the second region.

10. The secondary battery of claim 6, wherein the elastic force offering part is configured to separate the first region of the collector plate from the second region of the collector plate when the fuse part is fused.

11. The secondary battery of claim 6,
wherein the case comprises a cap plate between the collector plate and the terminal, and
wherein the elastic force offering part is between the collector plate and the cap plate.

12. The secondary battery of claim 11, further comprising an insulation part covering the first region of the collector plate and between the collector plate and the cap plate,
wherein the collector plate further comprises a first protrusion in the first region,
wherein the insulation part comprises a second protrusion, and wherein the elastic force offering part is coupled between the first protrusion and the second protrusion.

13. The secondary battery of claim 12, wherein the elastic force offering part is configured to separate the first region of the collector plate from the second region of the collector plate when the fuse part is fused.

14. The secondary battery of claim 12,
wherein the first protrusion extends substantially parallel to a side surface of the collector plate, and
wherein the second protrusion extends substantially parallel to a side surface of the insulation part.

15. The secondary battery of claim 11, further comprising an insulation part covering the first region of the collector plate and between the collector plate and the cap plate,
wherein the elastic force offering part is between the collector plate and the insulation part.

16. The secondary battery of claim 1, wherein the electrode assembly is at least partially suspended by the collector plate.

17. The secondary battery of claim 1, further comprising:
a second collector plate coupled to the electrode assembly and comprising a second fuse part;
a second terminal coupled to the second collector plate and extending to the outside of the case; and
a second elastic force offering part configured to exert an elastic force on the second fuse part.

18. A secondary battery comprising:
a case;
an electrode assembly in the case;
a collector plate coupled to the electrode assembly and having a notch;
a terminal coupled to the collector plate and extending to an outside of the case; and
an elastic force offering part between the case and a surface of the collector plate facing the case and contacting the collector plate at a location adjacent the notch,
wherein the elastic force offering part is positioned outside of the notch,
wherein the elastic force offering part is generally "W" shaped,
wherein at least two portions of the elastic force operating part contacts the collector plate, and
wherein at least two other portions of the elastic force operating part contacts an insulation part that is between the collector plate and the case.

* * * * *